United States Patent [19]

Campbell

[11] 4,070,349

[45] Jan. 24, 1978

[54] AROMATIC SULFIDE/SULFONE POLYMER PRODUCTION

[75] Inventor: Robert W. Campbell, Bartlesville, Okla.

[73] Assignee: Phillips Petroleum Company, Bartlesville, Okla.

[21] Appl. No.: 698,578

[22] Filed: June 22, 1976

[51] Int. Cl.$^2$ ............................................. C08G 75/16
[52] U.S. Cl. .............................. 260/79.3 M; 260/79.1; 260/79
[58] Field of Search ................... 260/79, 79.1, 79.3 M

[56] References Cited

U.S. PATENT DOCUMENTS 3,354,129  11/1967  Edmonds, Jr. et al. ............... 260/79
3,780,000  12/1973  Feasey et al. .................. 260/79.3 M

FOREIGN PATENT DOCUMENTS 1,153,035  5/1969  United Kingdom.

Primary Examiner—Melvyn I. Marquis

[57] ABSTRACT

High molecular weight aromatic sulfide/sulfone polymers are produced by contacting a dihalo aromatic sulfone, an alkali metal sulfide other than lithium sulfide, a heterocyclic amine, and, optionally, an alkali metal carboxylate. Use of at least one heterocyclic amine with or without an alkali metal carboxylate during the contacting results in polymers of high molecular weight having utility as coatings, films, molded objects, fibers, and the like.

10 Claims, No Drawings

AROMATIC SULFIDE/SULFONE POLYMER PRODUCTION

This invention relates to the production of polymers from aromatic compounds. In accordance with another aspect, this invention relates to a process for the production of high molecular weight aromatic sulfide/sulfone polymers by contacting a dihalo aromatic sulfone, a selected alkali metal sulfide, and at least one heterocyclic amine. In accordance with a further aspect, this invention relates to the production of high molecular weight aromatic sulfide/sulfone polymers by contacting a dihalo aromatic sulfone, a selected alkali metal sulfide, and at least one heterocyclic amine in the presence of an alkali metal carboxylate. In accordance with a further aspect, this invention relates to the production of p-phenylene sulfide/sulfone polymers by contacting a bis(p-halophenyl) sulfone, a selected alkali metal sulfide, and a heterocyclic amine in the presence of an alkali metal carboxylate.

In recent years a wide variety of high polymers has been prepared, many of which are currently being produced and marketed on a large scale. While such polymers are useful in many areas, one property of high polymers, particularly those of the thermoplastic type, which needs to be improved is the ability to withstand high temperature. Since thermoplastic materials can be molded rapidly and efficiently into almost any desired shape, they lend themselves to mass production. The high polymer, especially a thermoplastic material, which could stand very high temperatures and thus could be used in such areas as electrical components, wire coatings, automotive parts, and the like has been the objective of a great deal of research.

This invention provides a novel process for the production of aromatic sulfide/sulfone polymers of relatively high molecular weight. Such polymers are more desirable as molding resins than are aromatic sulfide/sulfone polymers of lower molecular weight since properties of the product molded from the polymer of higher molecular weight are superior.

Accordingly, an object of this invention is to produce aromatic sulfide/sulfone polymers exhibiting high molecular weight.

Another object of this invention is to provide a process for producing high molecular weight aromatic sulfide/sulfone polymers exhibiting good melt processability properties.

It is another object of this invention to provide a method employing a specific type of compound for the preparation of aromatic sulfide/sulfone polymers of increased molecular weight suitable for molding.

Other objects and aspects, as well as the several advantages of this invention, are apparent from a study of this disclosure and the appended claims.

In accordance with this invention, aromatic sulfide/sulfone polymers exhibiting high molecular weight are prepared by contacting at least one dihalo aromatic sulfone, at least one alkali metal sulfide other than lithium sulfide, and at least one heterocyclic amine.

In accordance with one embodiment of the invention, aromatic sulfide/sulfone polymers of high molecular weight are produced by contacting a dihalo aromatic sulfone, an alkali metal sulfide other than lithium sulfide, and a heterocyclic amine in the presence of an alkali metal carboxylate.

The use, additionally, of an alkali metal carboxylate in the instant process results in an aromatic sulfide/sulfone polymer of higher molecular weight as evidenced by higher inherent viscosity than that obtained without the use of the alkali metal carboxylate.

In one specific embodiment of the present invention, at least one dihalo aromatic sulfone such as a bis(p-halophenyl) sulfone, at least one alkali metal sulfide selected from the group consisting of sodium sulfide, potassium sulfide, rubidium sulfide, and cesium sulfide, and at least one heterocyclic amine are contacted in the presence of an alkali metal carboxylate under polymerization conditions for a period of time sufficient to form an aromatic sulfide/sulfone polymer exhibiting higher molecular weight than normally obtained.

Dihalo aromatic sulfones that can be employed in the process of this invention can be represented by the formula

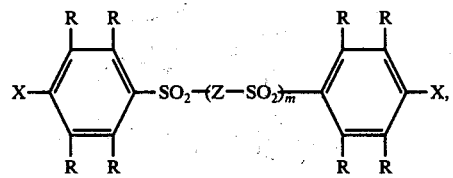

where each X is selected from the group consisting of fluorine, chlorine, bromine, and iodine; Z is a divalent radical selected from the group consisting of

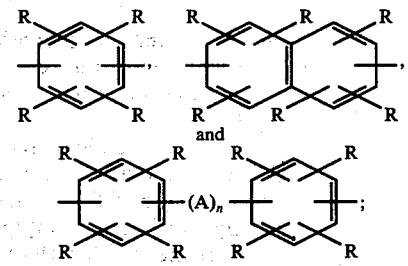

$m$ is 0 or 1; $n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, $m$ is 0.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)-benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenylphenyl] ether, bis[p-(p-chlorophenylsulfonyl)phenyl] sulfide, bis[p-(p-chlorophenylsulfonyl)phenyl] sulfone, bis[p-(p-bromophenylsulfonyl)-phenyl]methane, 5,5-bis[3-ethyl-4-(p-chlorophenylsulfonyl)phenyl]nonane, and the like, and mixtures thereof.

As indicated above, alkali metal sulfides that can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. Preferably, the alkali metal sulfide is employed in hydrated form.

Heterocyclic amines that can be employed in the process of this invention include those having a formula selected from the group consisting of

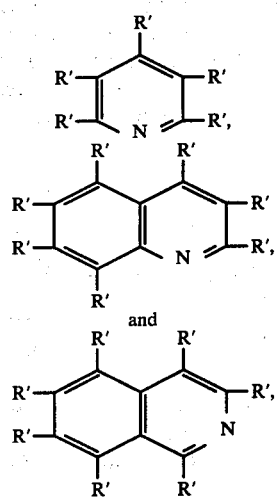

where each R' is selected from the group consisting of hydrogen and alkyl radicals, the total number of carbon atoms in each of the heterocyclic amine molecules being up to about 15.

Examples of some heterocyclic amines that can be employed in the process of this invention include pyridine, 2-methylpyridine, 3-ethylpyridine, 2-methyl-5-ethylpyridine, 4-isopropylpyridine, 2-butylpyridine, 3-hexylpyridine, 4-decylpyridine, pentamethylpyridine, quinoline, 2-methylquinoline, 4-ethyl-6-isopropylquinoline, 3-butylquinoline, 8-hexylquinoline, 2,3,4,5,6,7-hexamethylquinoline, isoquinoline, 3-methylisoquinoline, 1-ethyl-4-isobutylisoquinoline, 5-hexylisoquinoline, 1,4,5,6,7,8-hexamethylisoquinoline, and the like, and mixtures thereof.

Alkali metal carboxylates that optionally but preferably are employed in the process of this invention can be represented by the formula R"CO$_2$M, where R" is a hydrocarbyl radical selected from the group consisting of alkyl, cycloalkyl, and aryl, and combinations thereof such as alkaryl, aralkyl, and the like, the number of carbon atoms in said R" being within the range of 1 to about 20, and M is an alkali metal selected from the group consisting of lithium, sodium, potassium, rubidium, and cesium. Preferably, R" is an alkyl radical having 1 to about 6 carbon atoms or a phenyl radical and M is lithium. If desired, the alkali metal carboxylate can be employed as a hydrate or as a solution or dispersion in water.

Examples of some alkali metal carboxylates that can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The aromatic sulfide/sulfone polymers produced by the process of this invention can be characterized as having recurring

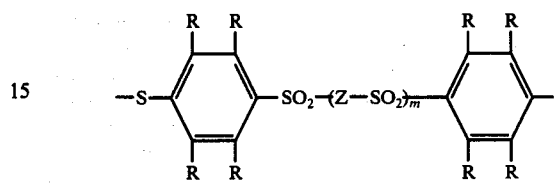

units, where each R, Z, and m is as defined above.

Although the mole ratio of dihalo aromatic sulfone to alkali metal sulfide can vary over a considerable range, generally it will be within the range of about 0.9:1 to about 2:1, preferably about 0.95:1 to about 1.2:1. The mole ratio of alkali metal carboxylate, when used, to alkali metal sulfide can vary over a wide range but generally will be within the range of about 0.05:1 to about 4:1, preferably about 0.1:1 to about 2:1. The amount of heterocyclic amine can vary greatly, generally being within the range of about 100 grams to about 2500 grams per gram-mole of alkali metal sulfide.

Although the reaction temperature at which the polymerization is conducted can vary over a considerable range, generally it will be within the range of about 170° C to about 240° C, preferably about 180° C to about 220° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone and heterocyclic amine substantially in the liquid phase.

It is to be understood that the process of this invention can be carried out by mixing the dihalo aromatic sulfone, the alkali metal sulfide, the heterocyclic amine, and the alkali metal carboxylate, if used, in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances, water can be removed from the resulting composition, e.g., by heating, distilling, and the like. For instance, water can be removed by distillation from a mixture of the heterocyclic amine, the alkali metal carboxylate, e.g., in anhydrous form or as a hydrate, if used, and the alkali metal sulfide in hydrated form or as an aqueous mixture, after which the residual mixture can be admixed with the dihalo aromatic sulfone and the resulting mixture then maintained at polymerization conditions. In a presently preferred embodiment, the dihalo aromatic sulfone, the alkali metal sulfide, the alkali metal carboxylate, and the heterocyclic amine are combined to form a mixture which is heated at an elevated temperature for a period of time sufficient to form an aromatic sulfide/sulfone polymer.

The aromatic sulfide/sulfone polymers produced by the process of this invention can be separated from the reaction mixture by conventional procedures, e.g., by filtration of the polymer, followed by washing with water, or by dilution of the reaction mixture with water, followed by filtration and water washing of the polymer. If desired, at least a portion of the washing with water can be conducted at an elevated temperature, e.g., up to about 250° C.

The aromatic sulfide/sulfone polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers.

EXAMPLES

In the following Examples, values for inherent viscosity were determined at 30° C in a 3:2 mixture, by weight, of phenol and 1,1,2,2-tetrachloroethane at a polymer concentration of 0.5 g/100 ml solution. Values for glass transition temperature ($T_g$) were determined on premelted and quenched polymer samples by differential thermal analysis. The values for polymermelt temperature (PMT) were determined by placing portions of the polymer on a heated bar with a temperature gradient. The name poly(p-phenylene sulfide/sulfone) is used to describe an aromatic sulfide/sulfone polymer having recurring

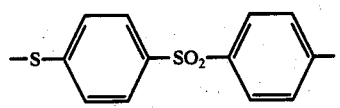

units in the polymer molecule.

EXAMPLE I

In a run within the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), 200 g pyridine, and 143.6 g (0.5 mole) bis(p-chlorophenyl) sulfone were charged to a stirrer-equipped 1-liter autoclave, which was then flushed with nitrogen. The resulting mixture was heated for 5 hours at 200° C at a pressure of 95–185 psig. The reaction product was washed repeatedly with hot water and dried to obtain a yield of 120.5 g of amorphous poly(p-phenylene sulfide/sulfone) having an inherent viscosity of 0.18, a $T_g$ of 188° C, and a PMT of 254° C.

Thus, based on inherent viscosity, the poly(p-phenylene sulfide/sulfone) was of sufficiently high molecular weight to be quite useful in such areas as coatings and compression molding.

EXAMPLE II

In another run within the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, 200 g pyridine, and 143.6 g (0.5 mole) bis(p-chlorophenyl) sulfone were charged to a stirrer-equipped, 1-liter autoclave, which was then flushed with nitrogen. The resulting mixture was heated for 5 hours at 200° C at a pressure of 145–170 psig. The reaction product was washed repeatedly with hot water and dried to obtain a yield of 121.4 g of amorphous poly(p-phenylene sulfide/sulfone) having an inherent viscosity of 0.31, a $T_g$ of 216° C, and a PMT of 278° C.

Thus, based on inherent viscosity, the poly(p-phenylene sulfide/sulfone) produced in this Example was of substantially higher molecular weight than that produced in Example I, in which lithium acetate dihydrate was not employed.

EXAMPLE III

In a control run outside the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, 200 g bis(2-methoxyethyl) ether (diethylene glycol dimethyl ether), and 143.6 g (0.5 mole) bis(p-chlorophenyl) sulfone were charged to a stirrer-equipped, 1-liter autoclave, which was then flushed with nitrogen. The resulting mixture was heated for 5 hours at 200° C at a pressure of 90–125 psig. The resulting product was washed repeatedly with hot water and dried to obtain a yield of 121.0 g of amorphous poly(p-phenylene sulfide/sulfone) having an inherent viscosity of 0.11, a $T_g$ of 136° C, and a PMT of 215° C.

Thus, based on inherent viscosity, the poly(p-phenylene sulfide/sulfone) produced in this Example, using the polar liquid bis(2-methoxyethyl) ether and lithium acetate dihydrate, was of substantially lower molecular weight than that produced in Example II, in which pyridine and lithium acetate dihydrate were employed, or even than that produced in Example I, in which pyridine was used in the absence of lithium acetate dihydrate.

I claim:

1. A process for the production of high molecular weight aromatic sulfide/sulfone polymers which comprises contacting
   a. at least one dihalo aromatic sulfone,
   b. at least one alkali metal sulfide selected from the group consisting of sodium sulfide, potassium sulfide, rubidium sulfide, and cesium sulfide, and
   c. at least one heterocyclic amine represented by a formula selected from

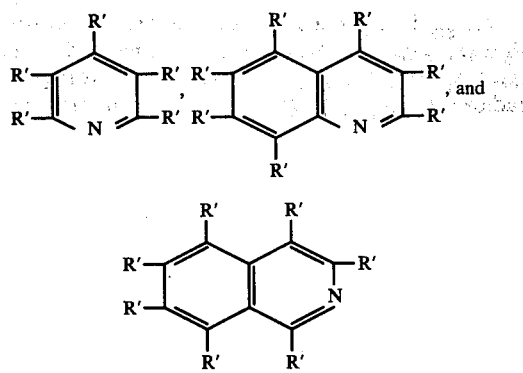

where each R' is selected from the group consisting of hydrogen and alkyl radicals, the total number of carbon atoms in each of the heterocyclic amine molecules being up to about 15, under polymerization conditions for a period of time sufficient to form an aromatic sulfide/sulfone polymer.

2. A process according to claim 1 wherein (a) is represented by the formula

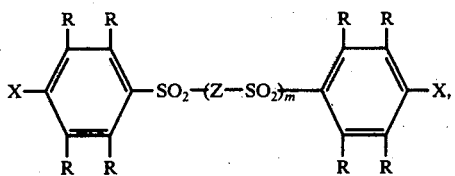

where each X is selected from the group consisting of fluorine, chlorine, bromine, and iodine; Z is a divalent radical selected from the group consisting of

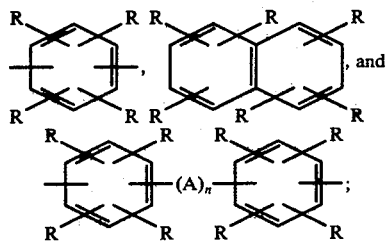

$m$ is 0 or 1; $n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

3. A process according to claim 1 wherein there is additionally present during said contacting (d) at least one alkali metal carboxylate represented by the formula R"$CO_2$M wherein R" is a hydrocarbyl radical having from 1 to about 20 carbon atoms and M is an alkali metal.

4. A process according to claim 2 wherein $m$ is 0 and (a) is represented by the formula

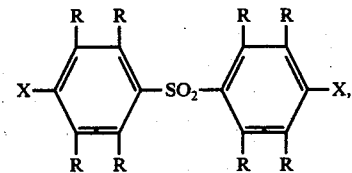

where each X is selected from the group consisting of fluorine, chlorine, bromine, and iodine, and each R is selected from the group consisting of hydrogen alkyl radicals having 1 to about 4 carbon atoms, the total number of carbon atoms in all of the R groups being within the range of 0 to about 12.

5. A process according to claim 1 wherein the temperature of the reaction is in the range of about 170° C to about 240° C and the pressure is sufficient to maintain liquid phase conditions and further wherein the mole ratio of (a) to (b) is in the range of 0.9:1 to 2:1, and the amount of (c) present is 100 grams to 2500 grams per gram-mole of (b).

6. A process according to claim 1 wherein
   a. is bis(p-chlorophenyl) sulfone,
   b. is sodium sulfide, and
   c. is pyridine.

7. A process according to claim 3 wherein
   a. is bis(p-chlorophenyl) sulfone,
   b. is sodium sulfide,
   c. is pyridine, and
   d. is lithium acetate dihydrate.

8. A process according to claim 2 wherein $m$ is 0 and (a) is represented by the formula

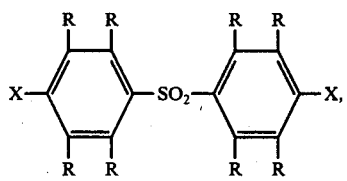

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12 , and
   d. is represented by the formula R"$CO_2$M wherein R" is a hydrocarbyl radical having from 1 to about 20 carbon atoms and M is an alkali metal.

9. A process according to claim 3 wherein the temperature of the reaction is in the range of about 170° C to about 240° C and the pressure is sufficient to maintain liquid phase conditions and further wherein the mole ratio of (a) to (b) is in the range of 0.9:1 to 2:1, the mole ratio of (d) to (b) is in the range of 0.05:1 to 4:1 and the amount of (c) present is 100 grams to 2500 grams per gram-mole of (a).

10. A process according to claim 9 wherein
   a. is bis(p-chlorophenyl) sulfone,
   b. is sodium sulfide,
   c. is pyridine, and
   d. is lithium acetate dihydrate.

* * * * *